United States Patent
Ode

(10) Patent No.: US 10,038,210 B2
(45) Date of Patent: Jul. 31, 2018

(54) FUEL CELL CABINET

(71) Applicant: BROTHER KOGYO KABUSHIKI KAISHA, Nagoya-shi, Aichi (JP)

(72) Inventor: Yasuhito Ode, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 394 days.

(21) Appl. No.: 14/995,598

(22) Filed: Jan. 14, 2016

(65) Prior Publication Data

US 2016/0218377 A1 Jul. 28, 2016

(30) Foreign Application Priority Data

Jan. 26, 2015 (JP) ................. 2015-012061

(51) Int. Cl.
*H01M 8/0271* (2016.01)
*H01M 8/2475* (2016.01)

(52) U.S. Cl.
CPC ................. *H01M 8/2475* (2013.01)

(58) Field of Classification Search
None
See application file for complete search history.

(56) References Cited

FOREIGN PATENT DOCUMENTS

| JP | S59-183403 U | * | 6/1986 | ............... H02B 1/12 |
|----|----|----|----|----|
| JP | 2003-263944 | * | 3/2002 | ............. H01H 33/53 |
| JP | 2006-164716 | * | 12/2004 | ............. H01M 8/04 |
| JP | 2006-76325 A | | 3/2006 | |
| JP | 2006-140163 A | | 6/2006 | |
| JP | 2006164716 A | | 6/2006 | |
| JP | 2009-301923 A | | 12/2009 | |

OTHER PUBLICATIONS

English translation of Box No. V 2. of the Written Opinion of the International Searching Authority issued in PCT/JP2015/079170 dated Dec. 15, 2015.

* cited by examiner

*Primary Examiner* — Ula C Ruddock
*Assistant Examiner* — Amanda Barrow
(74) *Attorney, Agent, or Firm* — K&L Gates LLP

(57) ABSTRACT

An example fuel cell cabinet, comprises: a fuel cell case provided with an opening and accommodating a fuel cell; a lid part covering the opening; a first fixing part fixing a first end of the lid part to the fuel cell case by a predetermined force; and a second fixing part fixing a second end different from the first end of the lid part to the fuel cell case by a force weaker than the predetermined force.

16 Claims, 10 Drawing Sheets

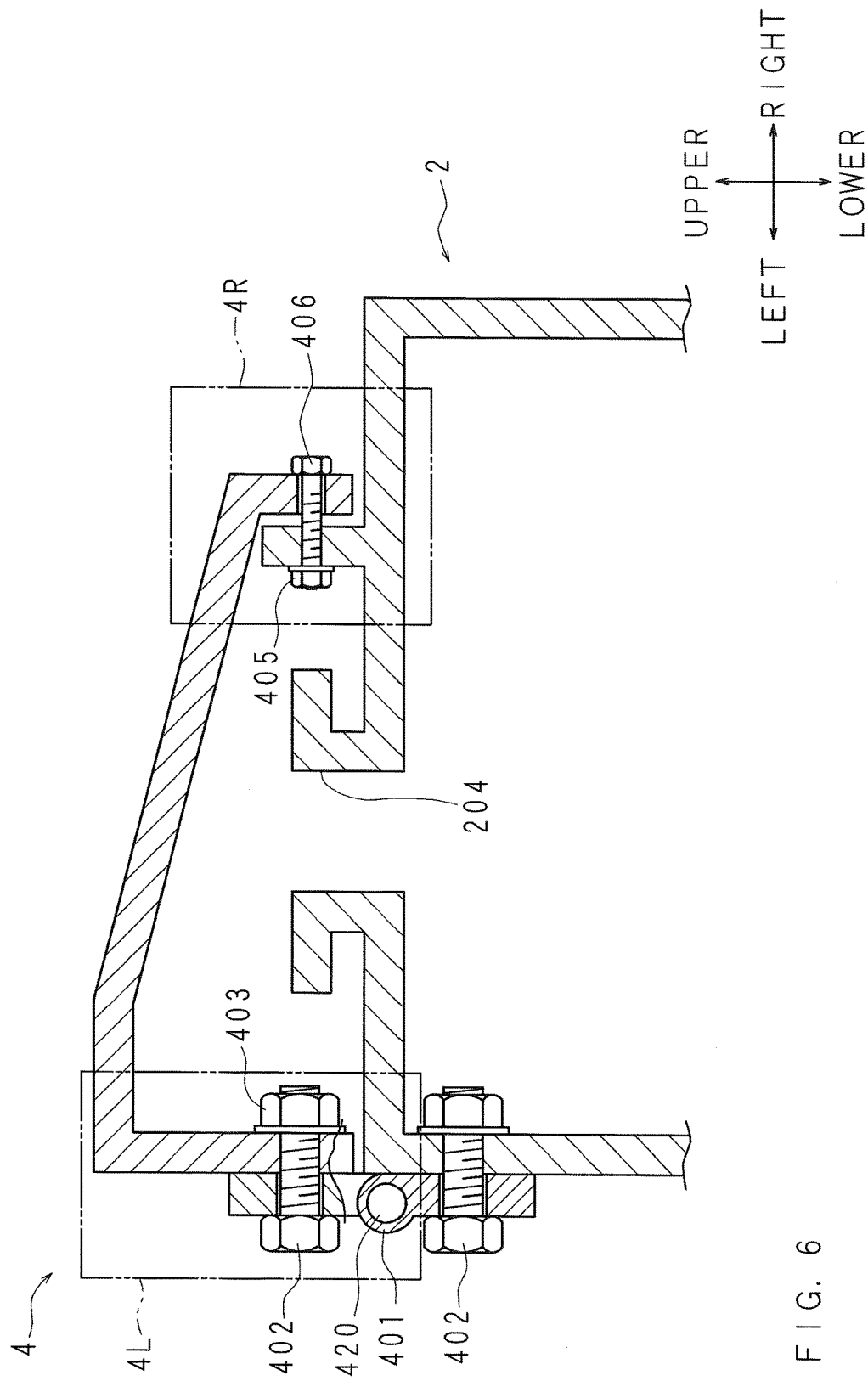
F I G. 6

FUEL CELL CABINET

CROSS-REFERENCE TO RELATED APPLICATIONS

This non-provisional application claims priority under 35 U.S.C. § 119(a) on Patent Application No. 2015-012061 filed in Japan on Jan. 26, 2015, the entire contents of which are hereby incorporated by reference.

FIELD

The technology herein relates to a fuel cell cabinet that can release the pressure inside the cabinet.

BACKGROUND AND SUMMARY

A fuel cell is a power generating device which can take out electricity by making, in general, hydrogen react with an oxidant. Moreover, hydrogen is a type of gas which is very light and is known as a substance which can easily combust and explode.

Conventionally, one example of a fuel cell cabinet includes a pressure releasing part which serves to release pressure when the pressure inside the cabinet reaches a predetermined value. The pressure releasing part has a configuration that tightly seals a through hole having a predetermined area formed at the cabinet by a depressurizing lid with a predetermined adhesion strength. In the cabinet, a double-sided adhesive tape or a bolt is used as a sealing part for tightly adhering the depressurizing lid.

In the case where the pressure inside the cabinet reaches a predetermined value, a depressurizing lid may be blown off. In order to reliably prevent the depressurizing lid from being blown off, the depressurizing lid needs regular checkups. A structure for easy checkup has therefore been desired.

In consideration of the above-described circumstances, it is an object to provide an example embodiment of a fuel cell cabinet which can release the pressure inside the cabinet without a lid part of the cabinet being blown off.

According to one aspect of the example embodiment, there is provided a fuel cell cabinet, comprising: a fuel cell case provided with an opening and accommodating a fuel cell; a lid part covering the opening; a first fixing part fixing a first end of the lid part to the fuel cell case by a predetermined force; and a second fixing part fixing a second end different from the first end of the lid part to the fuel cell case by a force weaker than the predetermined force.

According to one aspect of the example embodiment, a fuel cell cabinet includes the first fixing part fixing the first end of the lid part to the fuel cell case by a predetermined force, and the second fixing part fixing the second end different from the first end of the lid part to the fuel cell case by a force weaker than the predetermined force. The second fixing part is fixed with a force weaker than that for the first fixing part, and is thus preferentially be freed from its fixed state. As the second fixing part is freed from its fixed state, the pressure inside the cabinet is released to the outside of the cabinet, while the lid part may be held at the fuel cell case without the first fixing part being open. Accordingly, the pressure inside the cabinet may be released without the lid part being blown off.

The above and further objects and features will more fully be apparent from the following detailed description with accompanying drawings.

BRIEF DESCRIPTION OF THE DRAWINGS

FIG. 6 is an enlarged section view mainly illustrating a depressurizing lid according to the second embodiment;

DETAILED DESCRIPTION OF NON-LIMITING EXAMPLE EMBODIMENTS

Example embodiments will be described below with reference to the drawings.

[First Embodiment]

Figure 1:
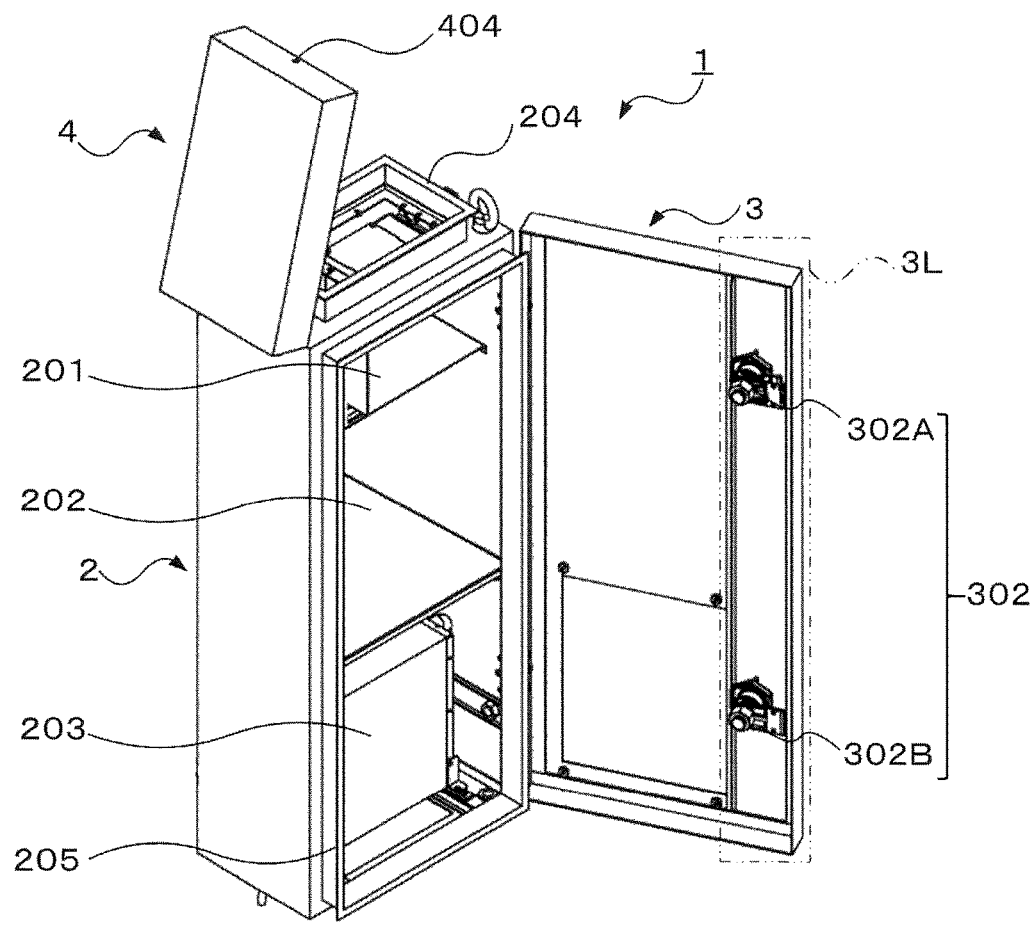
FIG. 1 is a perspective view illustrating the whole appearance of an example of non-limiting fuel cell cabinet according to the first embodiment.
Figure 1:
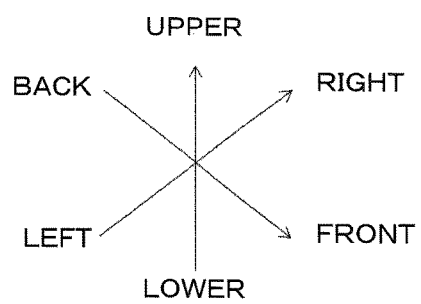

FIG. 1 is a perspective view illustrating the whole appearance of an example of non-limiting fuel cell cabinet 1 according to the first embodiment. It is to be noted that the front-back, left-right and upper-lower directions used in the description below are as indicated in the drawings. The fuel cell cabinet 1 includes a main body 2, a maintenance hatch 3 and a depressurizing lid 4 that are formed with metal. The main body 2 includes therein a pump storage 201, a cylinder storage 202 and a stack storage 203. The cylinder storage 202 houses a cylinder filled with hydrogen which is to be fuel of a fuel cell. The stack storage 203 houses a fuel cell stack containing multiple cells of the fuel cell. The main body 2 includes a depressurizing hole 204 at the upper part and an opening 205 at the front surface. Each of the cells of the fuel cell has a basic structure of a fuel cell formed from a fuel electrode serving as a negative electrode, a solid polymer membrane of electrolytes and an air electrode serving as a positive electrode that are pasted and integrated together. The main body 2 includes a pair of attachments 206 at a right side part 2R representing the right side surface of the main body 2 (see FIG. 2). The right side part 2R is fixed to a wall such as an exterior wall of a building or to a pole such as a utility pole with the attachments 206.

Figure 2:
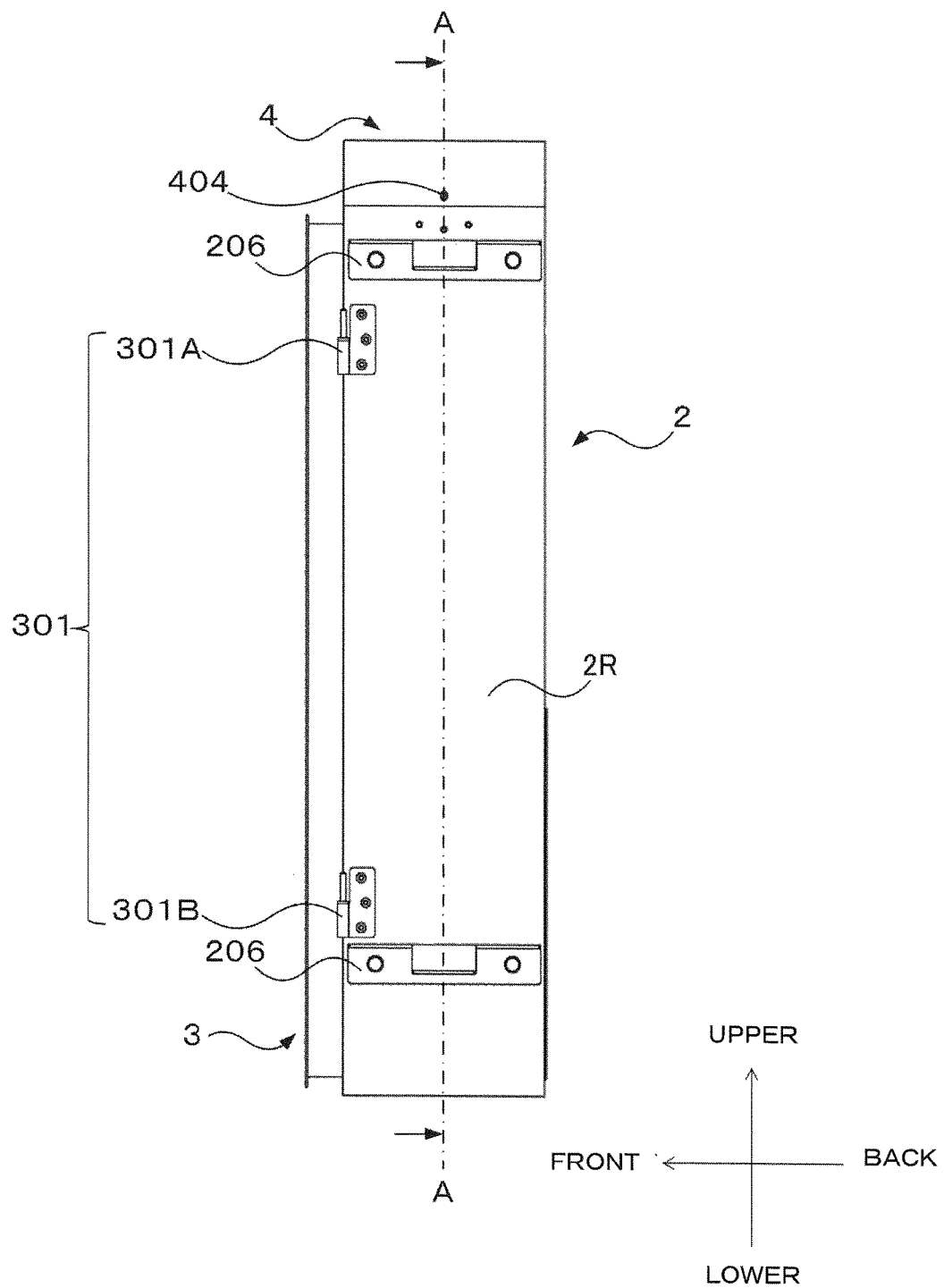
FIG. 2 is a side view illustrating a right side part of the fuel cell cabinet when viewed from the right side.

Next, the maintenance hatch 3 will be described with reference to FIG. 1 and FIG. 2. FIG. 2 illustrates the right side part 2R viewed from the right side of the fuel cell cabinet 1. The maintenance hatch 3 has a size capable of covering the opening 205 located at the front surface of the main body 2. The maintenance hatch 3 includes a hatch hinge (hinge for the hatch) 301 illustrated in FIG. 2 and a fixing element 302 illustrated in FIG. 1. In the present embodiment, the hatch hinge 301 has a hatch hinge 301A and a hatch hinge 301B. One end of the hatch hinge 301 is fixed to one end of the maintenance hatch 3 with bolts and nuts, while the other end of the hatch hinge 301 is fixed to the front side of the right side part 2R of the main body 2 with bolts and nuts. The nuts are welded, respectively, to the inner side of the main body 2 corresponding to the position where the hatch hinge 301 is fixed and to the inner side of the maintenance hatch 3 corresponding to the position where the hatch hinge 301 is fixed. The shaft center of the rotary shaft of the hatch hinge 301B is an extension of the shaft center of the rotary shaft of the hatch hinge 301A. The maintenance hatch 3 is rotatably fixed to the main body 2 around the shaft center of the rotary shaft of the hatch hinge 301.

Furthermore, the maintenance hatch 3 includes a fixing element 302 in a region 3L indicated by the dashed-two dotted line on the left side, in the front view, of the maintenance hatch 3 illustrated in FIG. 1. In the present embodiment, the fixing element 302 includes a fixing element 302A and a fixing element 302B. In a closed state of covering the opening 205, if the fixing element 302 is made in the fixed state, opening of the maintenance hatch 3 is prevented. The fixed state is a state where a plate included in the fixing element 302 is hooked on an edge of the opening 205 to prevent the maintenance hatch 3 from opening. That is, the maintenance hatch 3 rotates around the shaft center of the hatch hinge 301 so as to allow the fixing element 302 to prevent the maintenance hatch 3 from being shifted to the open state where the opening 205 is open from the closed state of covering the opening 205. For the hatch hinge 301 and the fixing element 302, those capable of withstanding a load at least three times higher than the allowable shear load of the second bolt 406, which will be described later, are employed.

Figure 3:
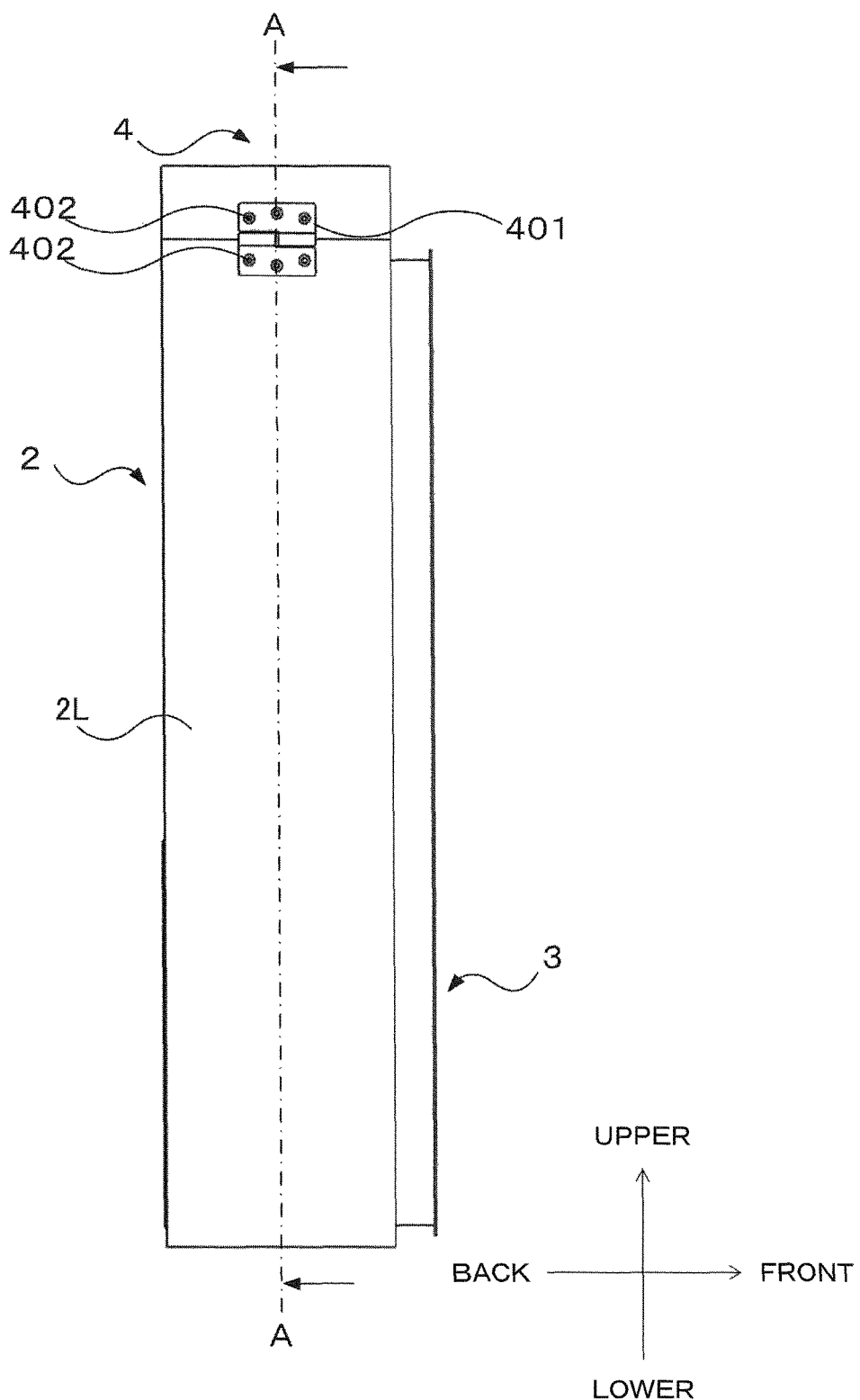
FIG. 3 is a side view illustrating the fuel cell cabinet when viewed from the left side.
Figure 4:
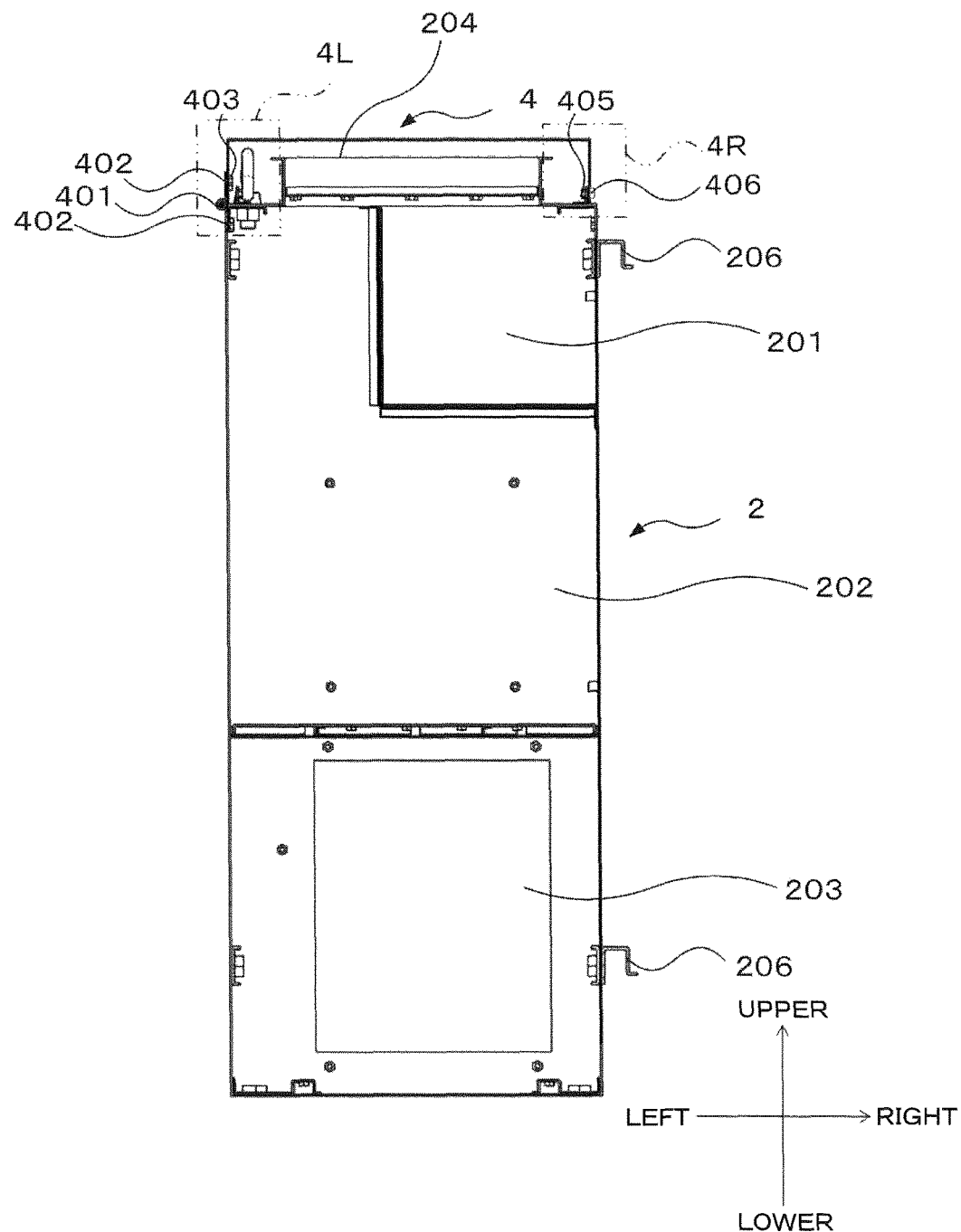
FIG. 4 is a section view of the fuel cell cabinet taken along the line A-A when viewed from the front side of the fuel cell cabinet in the direction of arrows illustrated in FIG. 2.

Next, the depressurizing lid 4 will be described with reference to FIGS. 1 to 5. FIG. 3 is a side view illustrating the fuel cell cabinet 1 when viewed from the left side. FIG. 4 is a section view of the fuel cell cabinet 1 taken along the line A-A and viewed from the front side of the fuel cell cabinet 1 in the direction of arrows illustrated in FIG. 2. The depressurizing lid 4 is capable of covering the depressurizing hole 204 and includes a lid hinge (hinge for the lid) 401, a first bolt 402, a first nut 403, a second nut 405 and a second bolt 406. Moreover, the depressurizing lid 4 is provided with a fixing hole 404 as illustrated in FIG. 2. In FIG. 4, a region 4L and a region 4R enclosed by dashed-two dotted lines indicate the right and left positions where the depressurizing lid 4 is fixed.

Figure 5:
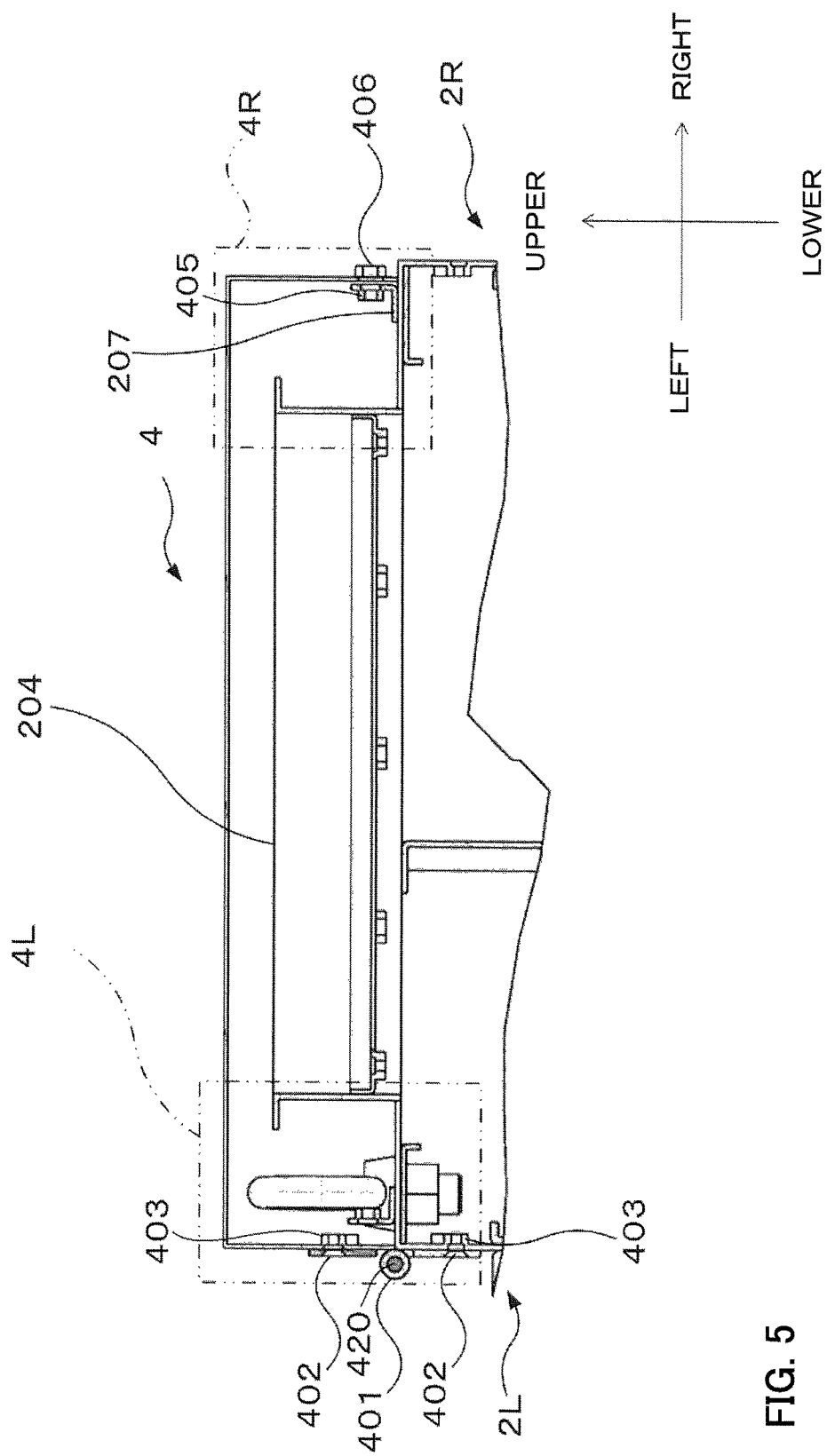
FIG. 5 is an enlarged section view mainly illustrating a depressurizing lid.

The configuration of the first fixing part located in the region 4L is now described. FIG. 5 is an enlarged section view mainly illustrating a depressurizing lid 4. FIG. 5 illustrates the shape of the depressurizing lid 4 taken along the line A-A and viewed in the direction of arrows in FIG. 2 or FIG. 3. The lid hinge 401 fixes the upper end of the left side part 2L illustrated in FIGS. 3 and 5 to the lower end of the left side surface of the depressurizing lid 4. Furthermore, as illustrated in FIG. 3, one end of the lid hinge 401 is fixed to the depressurizing lid 4 at the lower end of the left side surface of the depressurizing lid 4 with three first bolts 402 and three first nuts 403. Moreover, the other end of the lid hinge 401, i.e. the other end which is different from the end fixed to the depressurizing lid 4, is fixed to the main body 2 at the upper end of the left side part 2L with three first bolts 402 and three first nuts 403. The first nuts 403 are welded to the inside of the depressurizing lid 4 corresponding to the position where the lid hinge 401 is fixed and to the inside of the main body 2 corresponding to the position where the lid hinge 401 is fixed. The lid hinge 401 includes a rotary shaft 420 capable of rotating the depressurizing lid 4. Moreover, the lid hinge 401 has a restoring force so that the depressurizing lid 4 is made in the closed state of covering the depressurizing hole 204. As an example, the lid hinge 401 is a damper hinge.

The configuration of the second fixing part located in the region 4R is now described. In the closed state where the depressurizing lid 4 covers the depressurizing hole 204, the second bolt 406 illustrated in FIG. 5 is inserted into the fixing hole 404 illustrated in FIG. 2 from the outside to the inside of the depressurizing lid 4. The inserted second bolt 406 fixes the depressurizing lid 4 to the main body 2 together with the second nut 405. The second nut 405 is welded to an L-shaped steel 207, which is welded to the upper surface of the main body 2 and to a position where the depressurizing lid 4 may thereby be fixed with the second bolt 406 and the second nut 405.

One end of the depressurizing lid 4 located in the region 4L is fixed to the main body 2 with the lid hinge 401, the first bolt 402 and the first nut 403. Furthermore, one end of the depressurizing lid 4 located in the region 4R is fixed to the second bolt 406 penetrating the fixing hole 404, the second nut 405 and the L-shaped steel 207. Two side surfaces of the depressurizing lid 4 located in the regions 4L and 4R, respectively, are fixed to the main body 2. The main body 2 and the depressurizing lid 4 are fixed to each other in a non-sealed state without using a sealing material or the like. This state may form a gap through which air can pass between the depressurizing lid 4 and the main body 2. Leaked hydrogen is discharged to the outside of the main body 2 from a gap formed between the depressurizing lid 4 located at the upper part and the main body 2 because the hydrogen is light. The leaked hydrogen may be discharged to the outside from the gap, and thus the pressure inside the main body 2, which may gradually be increased due to the hydrogen leak, can be prevented from rising to an excessive value.

The depressurizing lid 4 is mounted so as to be rotatable around the shaft center of the first fixing part when the second fixing part opens. If the pressure inside the main body 2 exceeds the allowable shear load of the second bolt 406 at the second fixing part, the second bolt 406 breaks, making the depressurizing lid 4 in the rotatable state. The depressurizing lid 4 which is now in the rotatable state rotates around the shaft center of the rotary shaft 420 of the lid hinge 401, so that the pressure inside the main body 2 may quickly be discharged to the outside. Since the depressurizing lid 4 rotates around the shaft center of the rotary shaft 420 of the lid hinge 401, it opens the depressurizing hole 204 while being held at the main body 2. In order to obtain the effect as described above, the second fixing part is so defined as to be opened by a predetermined impact load. In general, the allowable load for a static load is assumed to be approximately three times the allowable load for an impact load. Even in the case where a static load acts on the second fixing part and an impact load with a magnitude similar to the static load acts on the first fixing part, the allowable load for the first fixing part is determined to be three times the allowable load for the second fixing part or higher so as to prevent the first fixing part from opening. Hence, the second fixing part is supposedly fixed with a weaker force compared to the first fixing part. Accordingly, the pressure inside the fuel cell cabinet 1 may be released without the depressurizing lid 4 being blown off. Furthermore, the load of three times or higher causes the second fixing part to be open and the first fixing part not to be open in any combinations of loads i.e. a static load, a dynamic load and an impact load, acting on the first fixing part and the second fixing part. Since the first fixing part is not opened with a predetermined load as describe above, the pressure inside the fuel cell cabinet 1 may be released without the depressurizing lid 4 being blown off. Furthermore, in the configuration as described above, the force applied to the depressurizing lid 4 is converted into the force of the rotary shaft 420, which makes it easy to release the pressure inside the fuel cell cabinet 1 and makes it difficult to free the first fixing part from its fixed state. This can release the pressure inside the fuel cell cabinet 1 without the depressurizing lid 4 being blown off.

More specifically, an example where the impact load of approximately 1500N acts on each of the first fixing part and the second fixing part will be described. In order to make the depressurizing hole 204 open by breaking the second bolt 406 located at the second fixing part, for example, one bolt made of a rolled steel for general structure is provided as the second bolt 406. For the first bolt 402, a rolled steel for general structure is similarly used, for example. Three first bolts 402 are provided at each of the fixing position for the depressurizing lid 4 at the lid hinge 401 and the fixing position for the upper end of the left side part 2L. As three first bolts 402 are provided while only one second bolt 406 is provided, the first fixing part fixes the depressurizing lid 4 so as to withstand a load corresponding to three times the load which would be withstood by the second fixing part. Accordingly, if the impact load of approximately 1500N acts on the first bolt 402 and the second bolt 406, the second bolt 406 breaks while the depressurizing lid 4 connected to the main body 2 by the lid hinge 401 rotates around the shaft center of the rotary shaft 420 of the lid hinge 401. The depressurizing lid 4 makes the depressurizing hole 204 open in the state of being held at the main body 2. Furthermore, the lid hinge 401 is a damper hinge, which has a restoring force for making the depressurizing lid 4 be in the closed state, so that the depressurizing lid 4 is in the closed state after the depressurizing hole 204 is released. This can prevent a foreign substance from intruding into the main body 2. It is to be noted that the numbers of the first bolt 402 and the second bolt 406 are not limited to three and one, respectively, but may be any numbers as long as the second fixing part is fixed weaker than the first fixing part.

Furthermore, whether or not the operation of releasing the pressure at the circumferential part of the depressurizing hole 204 is normally performed may easily be confirmed only by removing the second bolt 406. The magnitude of the internal pressure applied when the depressurizing hole 204 is opened due to the pressure inside the main body 2 may be adjusted by changing the diameter and material of the first bolt 402 and the second bolt 406.

The right side part 2R is fixed to a wall such as an exterior wall of a building or to a pole such as a utility pole with the attachments 206. The depressurizing lid 4 rotates around the shaft center of the first fixing part by the second fixing part located in the region 4R opening. That is, the second fixing part is located on a surface other than the surface opposite to the surface to be attached to a wall, pole or the like, which allows the depressurizing lid 4 to open in the direction where no wall or pole is present. Here, if the second fixing part is located on a surface opposite to the surface of the main body 2 which is to be fixed to a wall, pole or the like, the wall, pole or the like may possibly block the depressurizing lid 4 from opening. According to the configuration described above, as the movable range of the depressurizing lid 4 is not restricted by a wall, pole or the like, the depressurizing lid 4 is sufficiently opened and the pressure inside the fuel cell cabinet 1 may be released without the depressurizing lid 4 being blown off. It is to be noted that the second fixing part may also be located at any portion other than the region 4R only if it is located on a surface other than the surface opposite to the surface to be attached to a wall, pole or the like.

[Second Embodiment]

The second embodiment has a basic structure common to the first embodiment while a specific feature is added to the shape of the depressurizing lid 4. The second embodiment will be described with reference to FIG. 6. Since the second embodiment has a basic structure of the fuel cell cabinet 1 similar to that in the first embodiment, description of the similar parts will not be repeated here.

FIG. 6 is an enlarged section view mainly illustrating a depressurizing lid 4 according to the second embodiment. FIG. 6 illustrates the depressurizing lid 4 taken along the line A-A and viewed in the direction of arrows in FIG. 2 or 3. The depressurizing lid 4 is so fixed as to cover the depressurizing hole 204 formed at the upper part of the main body 2, as in the first embodiment. The structures of the first fixing part located in the region 4L and the second fixing part located in the region 4R will not be described since they are similar to those in the first embodiment. The upper surface of the depressurizing lid 4 is inclined while the region 4R side is formed lower than the region 4L side as illustrated in FIG. 6. For example, the region 4L side is formed higher than the region 4R side on the upper surface of the depressurizing lid 4 such that the inclination angle of the upper surface is thirty degrees when the horizontal surface is set as a reference. At the upper surface of the depressurizing lid 4, the wind force applied in the horizontal direction, i.e. left-right direction, is decomposed into a force in the direction going up the inclined surface and a force perpendicular to the inclined surface. As a result, the force for pressing the depressurizing lid 4 to the main body 2 can act thereon.

This inclination prevents the depressurizing lid 4 from opening due to natural wind as well as artificial wind generated from a car or the like, and also converts the force caused by an external factor such as wind into a downward force. As such, the depressurizing lid 4 is stably fixed to the main body 2 so as to prevent the second fixing part from opening due to an external force other than the pressure inside the fuel cell cabinet 1. This may further prevent the accumulation of rainwater or the like on the depressurizing lid 4.

[Third Embodiment]

The third embodiment has a basic structure common to the second embodiment and further includes a depressurizing hole 407 at the depressurizing lid 4. The third embodiment will be described with reference to FIG. 7. Since the basic structure of the fuel cell cabinet 1 in the third embodiment is similar to that of the second embodiment, and description of similar parts will not be repeated here.

Figure 7:
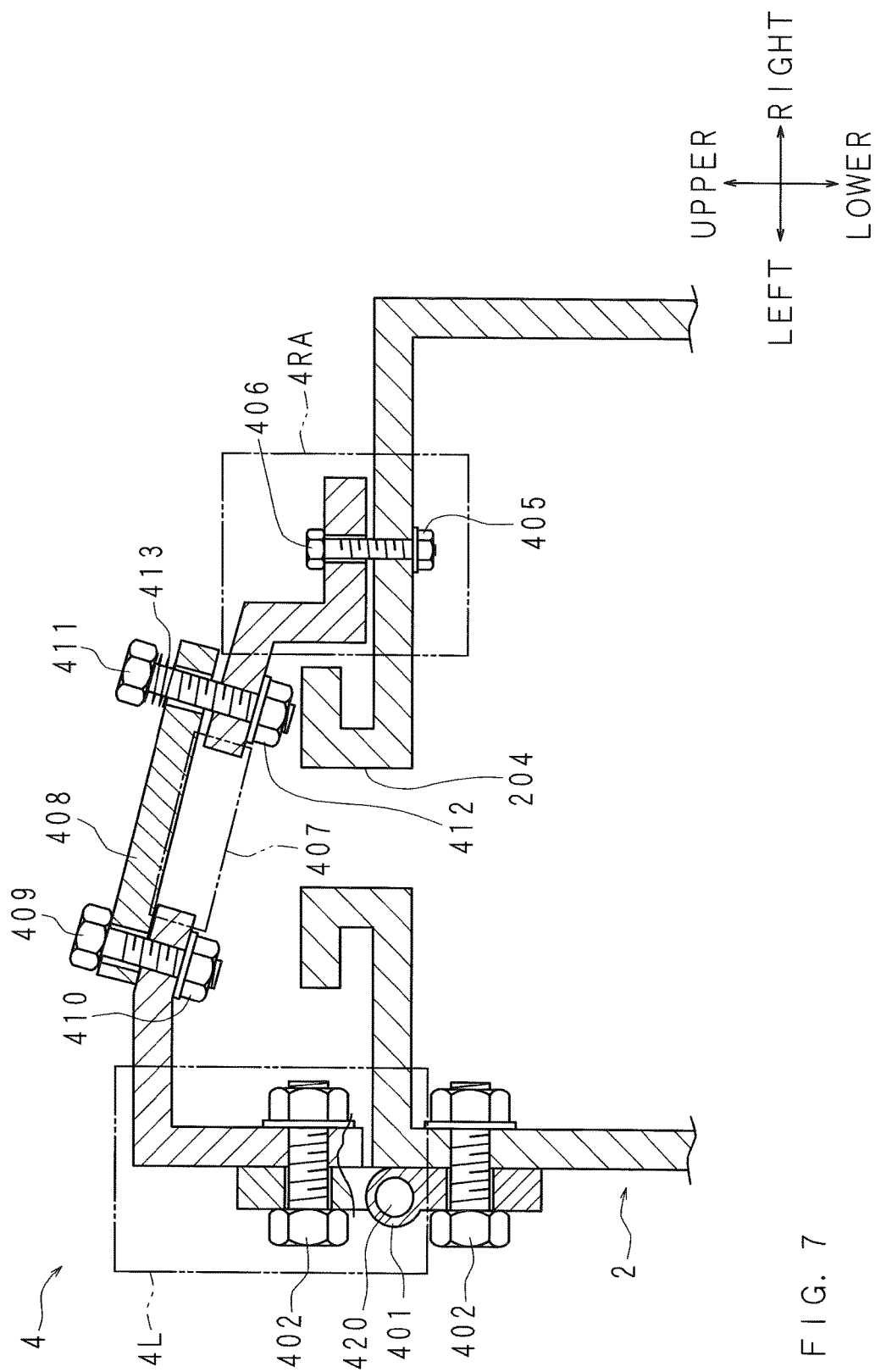
FIG. 7 is an enlarged section view mainly illustrating a depressurizing lid according to the third embodiment.

FIG. 7 is an enlarged section view mainly illustrating a depressurizing lid 4 according to the third embodiment. FIG. 7 illustrates the depressurizing lid 4 taken along the line A-A and viewed in the direction of arrows in FIG. 2 or 3. First, the structure of the second fixing part located in the region 4RA is described. At the region 4RA in FIG. 7, the second nut 405 and the second bolt 406 are fixed in a vertical posture, i.e. posture extending in the upper-lower direction. The second nut 405 is welded to the inside of the main body 2 corresponding to the position at which the depressurizing lid 4 is fixed with the second bolt 406. As the second nut 405 is welded and fixed to the main body 2, the main body 2 does not include an L-shaped steel 207.

Moreover, the depressurizing lid 4 includes a depressurizing hole 407 at the upper middle part of the depressurizing lid 4. A depressurizing door 408 may cover the depressurizing hole 407 and is formed with a material of the same nature as that of the depressurizing lid 4. The depressurizing door 408 is fixed to the depressurizing lid 4 at the upper left position of the depressurizing hole 407 with the third bolt 409 and the third nut 410 welded to the inside of the depressurizing lid 4. Furthermore, the depressurizing door 408 is fixed to the depressurizing lid 4 at the lower right position of the depressurizing hole 407 with the fourth bolt 411 and the fourth nut 412 welded to the inside of the depressurizing lid 4. However, the depressurizing door 408 makes no contact with the head of the fourth bolt 411, and the fourth bolt 411 is fixed in a state where a coil spring 413 is interposed between the head of the fourth bolt 411 and the depressurizing door 408. The depressurizing door 408 may be opened by the coil spring 413 being compressed due to the pressure from the inside of the main body 2 to discharge the pressure inside the main body 2 to the outside. In the third embodiment, though the coil spring 413 is included in the fourth bolt 411, a similar structure may be provided for the third bolt 409. Moreover, the depressurizing hole 407 and the depressurizing door 408 may also be provided on a side surface of the depressurizing lid 4 and at a depressurizing lid 4 with no inclination.

The bias force of the coil spring 413 is smaller than the allowable shear load of the first bolt 402 and the allowable tension load of the second bolt 406, and is decided based on a degree of the pressure to be maintained inside the main body 2. Moreover, when the pressure is increased rapidly, not moderately as in the case of the hydrogen leak, the depressurizing door 408 may be fixed so as not be blown. In FIG. 7, if the allowable tension load of the third bolt 409 and the fourth bolt 411 is three times the allowable tension load of the second bolt 406 or higher, the depressurizing door 408 will not be blown even if the second bolt 406 breaks and the depressurizing lid 4 is opened. Also in the case where the second bolt 406 is fixed in a horizontal posture, i.e. posture extending in the left-right direction, as illustrated in FIG. 6, the allowable tension load of the third bolt 409 and the fourth bolt 411 may be three times the allowable shear load of the second bolt 406 or higher. For example, bolts made of chromium molybdenum steel are employed for the third bolt 409 and the fourth bolt 411.

Since the depressurizing door 408 is located at the upper part of the depressurizing lid 4, hydrogen lighter than air may be released upward. As such, the hydrogen remaining inside the main body 2 and gas which is to be a cause of the pressure inside the main body 2 may more efficiently be discharged to the outside of the main body 2. Since gas may efficiently be discharged, the pressure inside the main body 2 may constantly be maintained at a certain value or lower. The depressurizing door 408 is opened only when the pressure exceeding the bias force of the coil spring 413 is applied to the depressurizing door 408. Furthermore, the depressurizing door 408 is automatically closed when the pressure inside the main body 2 is equal to or lower than the bias force of the coil spring 413. If the pressure inside the main body 2 does not exceed the bias force of the coil spring 413, the depressurizing door 408 is not opened. Therefore, even if the pressure inside the fuel cell cabinet 1 is increased, the pressure inside the fuel cell cabinet 1 may be released in a stepwise manner. Thus, a part of the fuel cell cabinet 1 will not be blown off, preventing damages to the fuel cell as well as the surrounding objects outside the fuel cell cabinet 1. The depressurizing door 408 is provided with the coil spring 413 so as to prevent raindrops, dust and the like from entering the inside of the main body 2. Resin or the like for enhancing the waterproof effect, such as silicone rubber, is provided on the surface where the depressurizing door 408 is in contact with the depressurizing lid 4 in order to increase effects of waterproof and dust prevention.

[Variation 1]

Figure 8A:
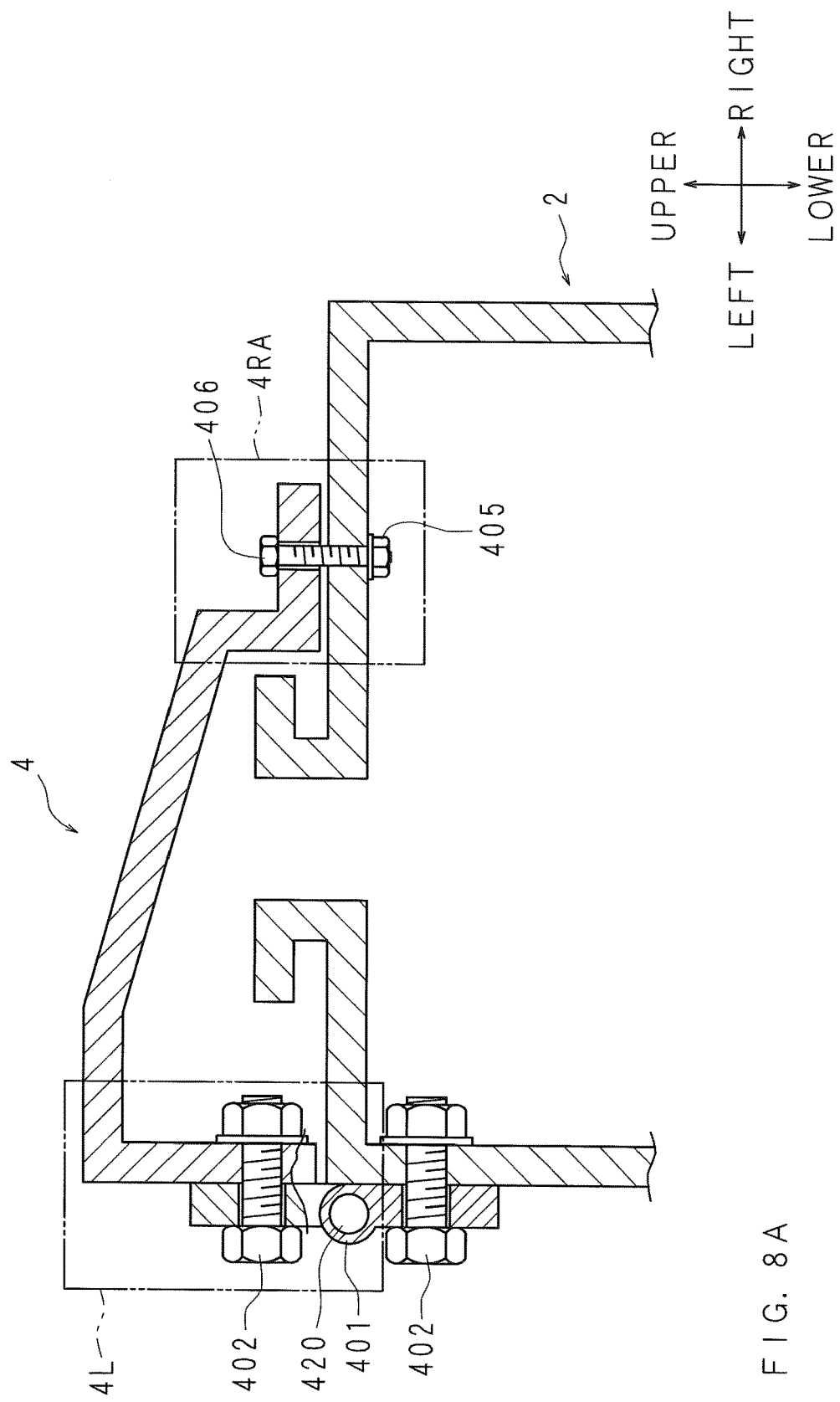
FIG. 8A is an enlarged section view mainly illustrating a depressurizing lid according to Variation 1.

FIG. 8A is an enlarged section view mainly illustrating a depressurizing lid 4 according to Variation 1. Variation 1 illustrated in FIG. 8A includes a basic structure similar to that of the second embodiment. Since the fuel cell cabinet 1 has a basic structure similar to the fuel cell cabinet 1 described in the second embodiment, description of similar parts will not be repeated here. The second fixing part according to Variation 1 has a structure similar to that of the second fixing part located in the region 4RA in FIG. 7 according to the third embodiment. Since the structure is similar to that of the second nut 405 and the second bolt 406 in the region 4RA described earlier, the description thereof will not be repeated here.

[Variation 2]

Figure 8B:
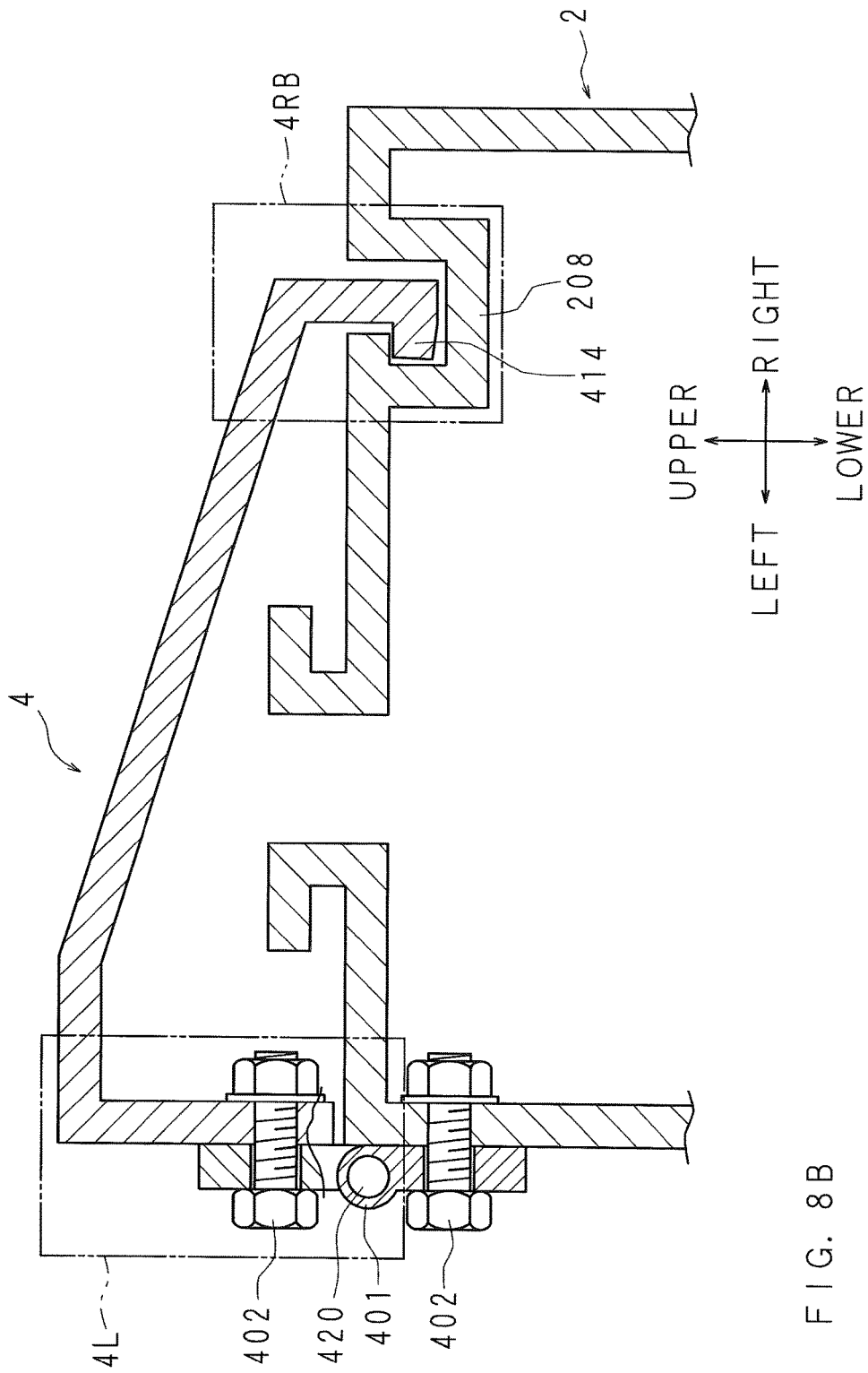
FIG. 8B is an enlarged section view mainly illustrating a depressurizing lid according to Variation 2.

FIG. 8B is an enlarged section view mainly illustrating a depressurizing lid 4 according to Variation 2. Variation 2 illustrated in FIG. 8B has a basic structure similar to that of the second embodiment. Since the fuel cell cabinet 1 has a basic structure similar to that of the fuel cell cabinet 1 according to the second embodiment, description of the similar parts will not be repeated here. In Variation 2, the second nut 405 and the second bolt 406 in the region 4R illustrated in FIG. 6 are not provided while a recess 208 and a protrusion 414 are provided as illustrated in a region 4RB. By the protrusion 414 being fitted into the recess 208 and fixed thereto, the depressurizing lid 4 may be prevented from being in the open state until the pressure inside the main body 2 reaches a predetermined value.

[Variation 3]

Figure 8C:
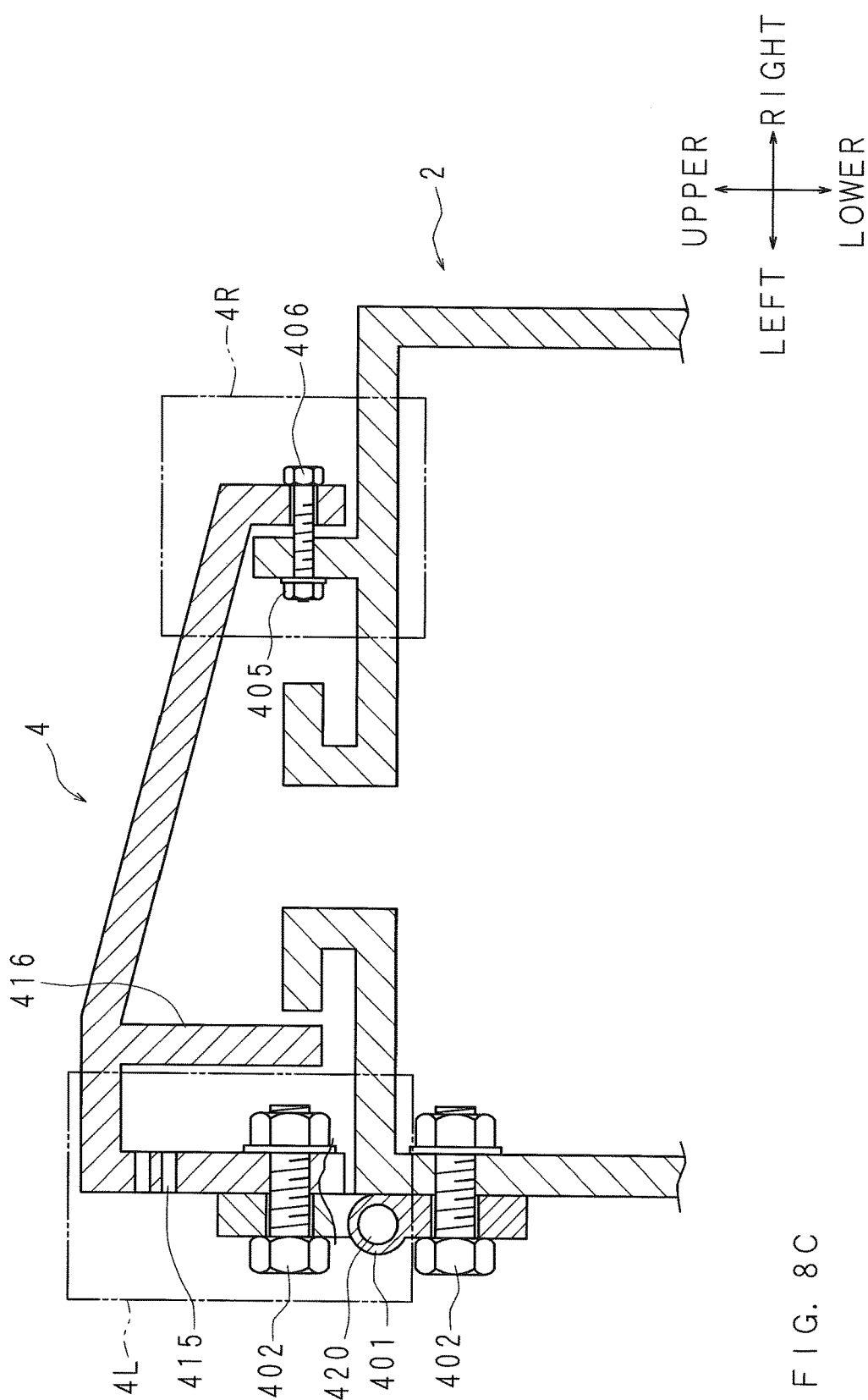
FIG. 8C is an enlarged section view mainly illustrating a depressurizing lid according to Variation 3.

FIG. 8C is an enlarged section view mainly illustrating a depressurizing lid 4 according to Variation 3. Variation 3 illustrated in FIG. 8C includes a basic structure similar to that of the second embodiment, and the depressurizing lid 4 includes a vent hole 415 and a partition 416. Since the basic structure of the fuel cell cabinet 1 is similar to that of the fuel cell cabinet 1 described in the second embodiment, description of similar parts will not be repeated. As in the third embodiment, the vent hole 415 discharges hydrogen remaining inside the main body 2 and gas which is to be a cause of the pressure inside the main body 2 to the outside of the main body 2. Since the gas passes through the vent hole 415 and is discharged to the outside of the main body 2, the pressure inside the main body 2 may constantly be maintained at a certain value or lower. The partition 416 is arranged between the depressurizing hole 204 and the first fixing part located in the region 4L. When the pressure is increased rapidly, not moderately as in the case of the hydrogen leak, the partition 416 which includes a surface directly receiving the pressure near the depressurizing hole 204 serves to reduce the direct impact of the abrupt pressure on the first bolt 402 and the first nut 403 of the first fixing part, and to make the abrupt pressure directly act on the second nut 405 and the second bolt 406. Since a large part of the pressure from the main body 2 directly acts on the second nut 405 and the second bolt 406, a force is preferentially applied to the second bolt 406. The partition 416 also serves to efficiently convert the abrupt pressure into rotation moment around the shaft center of the rotary shaft 420 of the lid hinge 401 and to make the depressurizing lid 4 be in the open state.

In the case where the lid hinge 401 is a damper hinge, the depressurizing lid 4 is made in the closed state by the restoring force of the damper hinge. This prevents the lid part from staying open. Accordingly, a cause of a failure such as raindrops may be prevented from entering the inside of the main body 2 through the released depressurizing hole 204.

Variations 1 to 3 described above may be implemented in combination with any of the embodiments and the variations, not limited to be implemented independently.

[Advantageous Effects of Embodiments]

In the case where the depressurizing lid 4 is fixed by a chemical fixing member such as an adhesive tape, it is possible for sunlight or the like to rapidly degrade the chemical fixing means. Moreover, in order to prevent the depressurizing lid 4 from malfunctioning due to aging and from operating unexpectedly, the fuel cell cabinet needs regular checkups. To the contrary, the fuel cell cabinet 1 according to the present embodiment may easily be checked for its operation only by removing the second bolt 406. When a component needs to be exchanged as a result of checkups, the lid hinge 401 as well as the bolts 402 and 406 may easily be exchanged.

[Association Between Claims and Embodiments]

The fuel cell cabinet 1 is an example of a fuel cell cabinet. The depressurizing hole 204 is an example of an opening. The main body 2 is an example of a fuel cell case. The depressurizing lid 4 is an example of a lid part. The left side of the depressurizing lid 4 illustrated in the region 4L is an example of the first end, whereas the right side of the depressurizing lid 4 illustrated in the region 4R is an example of the second end. Each of the lid hinge 401, the first bolt 402 and the first nut 403 is an example of the first fixing part. Each of the second nut 405 and the second bolt 406 is an example of the second fixing part. The load such as the shear load and the tension load is an example of the predetermined force, the first allowable load and the second allowable load.

As described above, the fuel cell cabinet according to one aspect of the example embodiment includes a fuel cell case provided with an opening and accommodating a fuel cell; a lid part covering the opening; a first fixing part fixing a first end of the lid part to the fuel cell case by a predetermined force; and a second fixing part fixing a second end different from the first end of the lid part to the fuel cell case by a force weaker than the predetermined force.

According to the example embodiment, the fuel cell cabinet includes the first fixing part which fixes the first end of the lid part to the fuel cell case with a predetermined force and the second fixing part which fixes the second end different from the first end of the lid part to the fuel cell case with a force weaker than the predetermined force. The second fixing part is fixed weaker than the first fixing part, and thus is preferentially released from its fixed state. By the second fixing part being released from its fixed state, the pressure inside the cabinet is released to the outside the cabinet while the lid part may be held at the fuel cell case without the first fixing part being open. Accordingly, the pressure inside the cabinet may be released without the lid part being blown off.

In the fuel cell cabinet according to the example embodiment, the first fixing part fixes the first end to the fuel cell case with a first allowable load, the second fixing part fixes the second end to the fuel cell case with a second allowable load such that the lid part is opened by a predetermined load from an inside of the fuel cell case, and the first allowable load is at least three times the second allowable load or higher.

According to the example embodiment, the first fixing part of the fuel cell cabinet fixes the first end to the fuel cell case with the first allowable load, while the second fixing part thereof fixes the second end to the fuel cell case such that the lid part is opened with a predetermined load from the inside of the fuel cell case. The first allowable load is at least three times the second allowable load or higher. Accordingly, even in the case where the static load, dynamic load and impact load act on the first fixing part and the second fixing part as a result of a predetermined value of pressure from the inside of the fuel batter case, the second fixing part is opened while the first fixing part is not opened. Furthermore, even if the load acting on the first fixing part and the second fixing part is in any combination of the static load, dynamic load and impact load, the second fixing part is opened while the first fixing part is not opened, so that the pressure inside the cabinet can be released without the lid part being blown off.

In the fuel cell cabinet according to the example embodiment, the first fixing part includes a rotary shaft rotatably supporting the lid part.

According to the example embodiment, in the fuel cell cabinet, the first fixing part includes a rotary shaft. The force applied to the lid part is converted into a force in the rotating direction by the rotary shaft. Because the force applied to the lid part is converted into the force in the rotating direction, the pressure inside the cabinet may easily be released, and the fixing state of the first fixing part is not easily released. Accordingly, the pressure inside the cabinet may be released without the lid part being blown off.

In the fuel cell cabinet according to the example embodiment, the first fixing part has a restoring force for making the lid part be in a closed state.

According to the example embodiment, the fuel cell cabinet has a restoring force by which the first fixing part including the rotary shaft makes the lid part be in the closed state. This allows the lid part which is in the open state to return to the closed state, preventing intrusion of foreign substances into the fuel cell case.

In the fuel cell cabinet according to the example embodiment, the opening is formed at an upper part of the fuel cell case, and the second fixing part is located on a surface other than a surface opposite to a surface of the fuel cell case that is fixed to a wall or a pole.

According to the example embodiment, in the fuel cell cabinet, the opening is formed at the upper part of the fuel cell case. The second fixing part is located on a surface other than the surface opposite to the surface of the fuel cell case that is fixed to a wall or a pole. This can release hydrogen which is a fuel of the fuel cell and is lighter than the air upward. Here, if the second fixing part is located on the surface opposite to the surface of the fuel cell case that is fixed to a wall or a pole, the wall or the pole to which the surface is fixed may block the lid from opening. According to the example embodiment, as the second fixing part is located on a surface other than the surface opposite to the surface attached to a wall or a pole, the lid part may be opened in the direction without a wall or a pole. As such, the movable range of the lid part is not restricted by a wall or a pole, and thus the lid part is sufficiently opened, which can release the pressure inside the cabinet without the lid part being blown off.

In the fuel cell cabinet according to the example embodiment, the lid part is formed to be inclined downward from the first end to the second end.

According to the example embodiment, in the fuel cell cabinet, the lid part is formed to be inclined downward from the first end to the second end. Thus, due to a force outside the cabinet such as a wind force for example, the lid part receives a force which presses the lid part on the fuel cell case. This can prevent the second fixing part from being open by an external force other than the pressure inside the cabinet.

In the fuel cell cabinet according to the example embodiment, further comprising an open/close part located outside the fuel cell case and capable of opening and closing a depressurizing hole formed at the lid part, the open/close part covers up the depressurizing hole, is fixed to the lid part so as to be opened and closed, and receives a restoring force acting on the open/close part such that a closed state where the open/close part covers up the depressurizing hole is obtained, and the open/close part is opened when a pressure from an inside of the fuel cell case is equal to or higher than a predetermined value and is closed by the restoring force when the pressure from the inside of the fuel cell case falls below the predetermined value.

According to the example embodiment, the fuel cell cabinet includes an open/close part located outside the fuel cell case, which can open and close the depressurizing hole formed at the lid part. The open/close part covers up the depressurizing hole and is fixed to the lid part so as to be opened and closed. A restoring force acts on the open/close part such that the closed state is obtained in which the open/close part covers up the depressurizing hole. The open/close part is opened when the pressure from the inside of the fuel cell case is equal to or higher than a predetermined value, and is closed due to the restoring force when the pressure from the inside of the fuel cell case falls below the predetermined value. The open/close part releases the pressure weaker than that applied when the second fixing part is opened, to the outside the cabinet through the depressurizing hole. Accordingly, even if the pressure inside the cabinet is increased, the pressure inside the cabinet may be released in a stepwise manner, which can prevent damages to the fuel cell as well as the surrounding objects outside the cabinet without a part of the cabinet being blown off.

It should be understood that the embodiments disclosed herein are illustrative and non-restrictive in every respect. Since the scope of the example embodiment is defined by the appended claims rather than by the description preceding them, and all changes that fall within metes and bounds of the claims, or equivalence of such metes and bounds thereof are therefore intended to be embraced by the claims. That is, embodiments obtained by combining technical means appropriately modified within the scope defined by the appended claims are also included in the technical scope of the example embodiment.

It is noted that, as used herein and in the appended claims, the singular forms "a", "an", and "the" include plural referents unless the context clearly dictates otherwise.

What is claimed is:

1. A fuel cell cabinet, comprising:
   a fuel cell case provided with an opening and accommodating a fuel cell;
   a lid part covering the opening;
   a first fixing part fixing a first end of the lid part to the fuel cell case by a predetermined force;
   a second fixing part fixing a second end different from the first end of the lid part to the fuel cell case by a force weaker than the predetermined force; and
   an open/close part located outside the fuel cell case and capable of opening and closing a depressurizing hole formed at the lid part, wherein
   the open/close part covers up the depressurizing hole, is fixed to the lid part so as to be opened and closed, and receives a restoring force acting on the open/close part such that a closed state where the open/close part covers up the depressurizing hole is obtained, and
   the open/close part is opened when a pressure from an inside of the fuel cell case is equal to or higher than a predetermined value and is closed by the restoring force when the pressure from the inside of the fuel cell case falls below the predetermined value.

2. The fuel cell cabinet according to claim 1, wherein
   the first fixing part fixes the first end to the fuel cell case with a first allowable load,
   the second fixing part fixes the second end to the fuel cell case with a second allowable load such that the lid part is opened by a predetermined load from an inside of the fuel cell case, and
   the first allowable load is at least three times the second allowable load or higher.

3. The fuel cell cabinet according to claim 1, wherein the first fixing part includes a rotary shaft rotatably supporting the lid part.

4. The fuel cell cabinet according to claim 2, wherein the first fixing part includes a rotary shaft rotatably supporting the lid part.

5. The fuel cell cabinet according to claim 1, wherein the first fixing part has a restoring force for making the lid part be in a closed state.

6. The fuel cell cabinet according to claim 2, wherein the first fixing part has a restoring force for making the lid part be in a closed state.

7. The fuel cell cabinet according to claims 3, wherein the first fixing part has a restoring force for making the lid part be in a closed state.

8. The fuel cell cabinet according to claims 4, wherein the first fixing part has a restoring force for making the lid part be in a closed state.

9. The fuel cell cabinet according to claim 1, wherein
   the opening is formed at an upper part of the fuel cell case, and
   the second fixing part is located on a surface other than a surface opposite to a surface of the fuel cell case that is fixed to a wall or a pole.

10. The fuel cell cabinet according to claim 2, wherein
    the opening is formed at an upper part of the fuel cell case, and
    the second fixing part is located on a surface other than a surface opposite to a surface of the fuel cell case that is fixed to a wall or a pole.

11. The fuel cell cabinet according to claims 3, wherein
    the opening is formed at an upper part of the fuel cell case, and
    the second fixing part is located on a surface other than a surface opposite to a surface of the fuel cell case that is fixed to a wall or a pole.

12. The fuel cell cabinet according to claim 4, wherein
    the opening is formed at an upper part of the fuel cell case, and
    the second fixing part is located on a surface other than a surface opposite to a surface of the fuel cell case that is fixed to a wall or a pole.

13. The fuel cell cabinet according to claim 1, wherein the lid part is formed to be inclined downward from the first end to the second end.

14. The fuel cell cabinet according to claim 2, wherein the lid part is formed to be inclined downward from the first end to the second end.

15. The fuel cell cabinet according to claim 3, wherein the lid part is formed to be inclined downward from the first end to the second end.

16. The fuel cell cabinet according to claim 4, wherein the lid part is formed to be inclined downward from the first end to the second end.

\* \* \* \* \*